United States Patent [19]

Dale et al.

[11] 4,252,687

[45] Feb. 24, 1981

[54] CATALYSTS

[75] Inventors: Robert W. Dale; John J. Rooney, both of Belfast, Northern Ireland

[73] Assignee: Gallaher Limited, Belfast, Northern Ireland

[21] Appl. No.: 4,277

[22] Filed: Jan. 17, 1979

[30] Foreign Application Priority Data

Jan. 20, 1978 [GB] United Kingdom ................ 2391/78

[51] Int. Cl.³ .......................... B01J 29/04; B01J 23/40
[52] U.S. Cl. .............................. 252/455 Z; 252/455 R; 252/463; 252/466 PT
[58] Field of Search ............... 252/455 Z, 463, 455 R, 252/466 PT

[56] References Cited

U.S. PATENT DOCUMENTS

| | | | |
|---|---|---|---|
| 2,859,185 | 11/1958 | Kimberlin, Jr. et al. | 252/463 X |
| 2,930,766 | 3/1960 | Lacey | 252/466 PT |
| 3,009,885 | 11/1961 | Bertolacini | 252/463 X |
| 3,042,627 | 7/1962 | Keith et al. | 252/466 PT |
| 3,070,639 | 12/1962 | Geerts et al. | 252/463 X |
| 3,210,296 | 10/1965 | Gray | 252/466 PT |
| 3,789,025 | 1/1974 | Tauster | 252/463 X |

*Primary Examiner*—Carl F. Dees
*Attorney, Agent, or Firm*—Murray and Whisenhunt

[57] ABSTRACT

A catalyst is made by creating a deficiency of hydroxyl groups in a hydroxyl containing support and contacting the support, while thus activated with a solution of a substance providing a catalytically active material. Generally the catalyst is made by contacting the solution with freshly crushed pellets of, for instance, a zeolite.

25 Claims, No Drawings

CATALYSTS

Catalysts for gas phase reactions often comprise a catalytically active material, often a metal such as platinum or nickel, carried on a refractory support material, for example alumina, a zeolite or a clay. The catalyst is generally made by contacting the support with an aqueous solution of a compound providing the catalytically active material, generally a salt of a catalytically active metal, followed by heating to dry the catalyst and then heating at high temperature in a reducing atmosphere to decompose the salt or other compound.

The activity of the catalyst for the chosen gas phase reaction depends upon the combination of support and catalytically active material and upon the method of preparation. Whilst the activity of many catalysts in high temperature reactions is considered to be adequate, although improvement in this may be desirable in many instances, the activity of catalysts in low temperature gas phase reactions tends to be too low for many purposes. For instance attempts have been made to devise a catalyst for the low temperature (e.g. below 100° C. and preferably 15° to 80° C.) oxidation of carbon monoxide to carbon dioxide, for instance for incorporation in a cigarette filter, but such catalysts have been too inactive to be commercially useful.

It is well known to heat a catalyst support or catalyst for various purposes, and such heating is sometimes said to result in activation. In some methods the heating results in a chemical reaction occurring. In other methods a temporary physical change is created. It is standard to make so-called "activated alumina" by heat treatment of aluminium hydroxide gel and to use this as a support, such heating involving driving water from the support.

Usually no particular precautions are observed after any such heat treatment and before any subsequent impregnation step. Typical of such processes are those described in U.S. Pat. No. 4,020,013 and British Pat. Nos. 1,474,109 and 1,351,562. For instance the latter gives no directions as to how the support is to be handled between calcination and impregnation. The normal technique would be to allow the support to cool in air.

We have now found that very good activity, especially in catalysts for low temperature reactions, can be obtained if the support is subjected to a particular activation step and is impregnated while still activated.

According to the invention a catalyst is made by a method comprising generating in a hydroxyl containing solid support material surfaces activated by having a deficiency of hydroxyl groups, and contacting the surfaces while thus activated with a solution of a substance providing catalytically active material.

One method of generating the activated surfaces comprises heating the support material under conditions such as to create the deficiency of hydroxyl groups and then contacting the activated support with the impregnating solution before there is any substantial loss of activity. For instance the active support may be cooled under anhydrous conditions or, preferably, quenched in the solution, or the active sites may be protected from deactivation by being trapped within pellets of the support, and exposed later by crushing of the pellets.

Another method, that is applicable when one is starting from the conventional pellet form of hydroxyl containing support material, comprises crushing the pellets.

An alternative way of indicating that the surfaces have a deficiency of hydroxyl groups is to say that they are activated by providing Lewis acid sites in them.

It seems that surfaces that have been activated become deactivated upon ageing and so unless the surfaces are protected within pellets of the support the contact of the solution with the activated surfaces must occur substantially immediately after generation of the surfaces, that is to say before ageing occurs sufficiently to deactivate them to an unacceptable extent. Generally therefore contact is within three days and preferably within 3 hours, most preferably within 1 hour, of generating the surfaces. The permitted storage time can be extended by, for example, storing in anhydrous conditions or under a vacuum.

The precise mechanism by which the deficiency of hydroxyl groups or the excess of Lewis acid sites are generated is not entirely clear. In the method involving crushing pellets it appears possible that the grinding step exposes strain sites within the crystal structure at the surfaces of the support, including within the micropores, and that because of these strain sites more efficient distribution of the catalytic material occurs provided the solution of catalytic material is contacted with the support before the strain has been released upon storage or by contamination with poisons or other materials.

The most reliable results are, however, obtainable when the generation of the active surfaces having a deficiency of hydroxyl groups has been by a method comprising heating the support material to a temperature of at least 20° C. above the temperature at which chemisorbed water is driven off but below the temperature at which substantial degradation of the support material starts to occur. This is the preferred mechanism for generating activated surfaces in powdered support material starting from powder, for example where the particle size is 50 microns or less. It is probably also the mechanism involved in generating the activated surfaces in preferred products made by crushing pellets. Thus such pellets are preferably ones that have been made by such a heating step, thereby creating the active form of the support material, and have then been pelleted whilst still in the active form, i.e. the heating being conducted substantially immediately prior to or during the manufacture of the pellets. It seems that the active form is trapped within and is protected from ageing influences by the outer layers of the support material, which upon ageing become deactivated, but upon crushing the active form is then exposed. The heating step that generates this active form may be the conventional calcination step to which support material is traditionally subjected during its manufacture prior to or during pelleting.

One main method of activation according to the invention thus comprises heating powdered support material whilst another comprises crushing pelleted support material that was calcined during or prior to manufacture.

Although the described heating step is preferably applied to powder it can also be applied to pellets, to activate the exposed surfaces of them, and these activated pellets may then either be used as such or may be crushed before use.

The heating conditions necessary to achieve activation can readily be ascertained by routine experiment. With most support materials the heating temperature needs to be between 300° and 800° C., with a range of 400° to 650° C., especially 500° to 600° C., generally being found to be optimum, especially when the support material is a zeolite or alumina.

The removal of chemisorbed water, and subsequent creation of a deficiency of hydroxyl groups, can be observed by differential thermal analysis. Thus the support material sample under observation and a reference of inert material (eg alumina that has itself been preheated several times) may be heated under identical conditions and the difference of temperatures prevailing within each sample observed. If aged powder is being heated, it will be found that as the inert reference temperature increases above 100° C. the amount by which the sample of support material is cooler than the inert material increases to a peak, generally at around 200° or 300° C. Up to this peak the difference can be accounted for initially by considering physical removal of water and then removal of chemisorbed water and for the purposes herein we consider that substantially all the chemisorbed water has been driven off once this peak has been passed. After the peak has been passed the temperature difference between the sample and the reference gradually decreases, and during this stage it appears that dehydroxylation is occurring. The temperature difference reaches a minimum, at which optimum dehydroxylation and activation has occurred, and thereafter may tend to increase again, this probably indicating the initiation of chemical degradation of the support.

The heating may be conducted in an atmosphere that permits the expulsion of water and most preferably is conducted by calcining in air or nitrogen for a period that can be determined by routine experimentation. Generally it is for from 1 to 72 hours, most preferably 6 to 24 hours.

A simple way of testing whether any particular support material is capable of being activated by the heating mechanism comprises applying this differential thermal analysis to samples of the support material. If it is already activated, and dehydroxylated, there will be no large temperature difference due to physically absorbed water but instead there will be a gradual increase in temperature difference, this indicating probably that irrespective of the temperature the further heating is simply causing degradation of the support, to some extent at least.

The presence of the electron rich and electron poor centres created by the dehydroxylation, that is to say the excess Lewis acid and base centres, can be proved by iodine titration in conventional manner. Thus the material may be treated with a solution of iodine in dry hexane followed by titration with thiosulphate. The smaller is the titre the larger is the number of redox sites, and thus the greater is the activity. For instance a commercially available zeolite 13X powder has a titre of 63 ml but after activation by heating at 550° C. for 16 hours has a titre of 37 ml, this indicating a considerable increase in redox sites and thus activity. Naturally activation conditions are best selected to give as large a decrease in the titre as possible, and when further decrease is unobtainable this indicates that the optimum activity with that particular support has probably been obtained.

The support material that may be used in the invention may be any material containing hydroxylic groups and that is suitable for use as a catalyst, either in low temperature processes or higher temperature processes. Generally it will be a refractory material and generally it will be porous. Typical materials, that may be used in the amorphous state, are alumina, silica, titania, magnesia, zirconia, and silico-aluminates that contain some hydroxylic group. An example of an aluminium silicate clay that can be used is montmorillonite. Preferably however the support material is a zeolite. The zeolite may be, for example, a zeolite of the A, X or Y series with best results generally being obtained with the A and X series. Preferred support materials are zeolite 3A, 4A, 5A, 10X and 13X, zeolite 13X, 4A and 5A being preferred. The support material may be utilised in the form of pellets, for example containing a clay binder and having a particle size of 1.3 to 3 mm and which are then crushed to powder, for example less than 0.1 mm, most preferably less than 50 microns, so as to generate the active surfaces or the support material may be in the form of powder, for example less than 0.1 mm and preferably less than 50 microns, and then heated in this form to generate the active surfaces. Most preferably the particle size of the powder, especially when it is being heated to activate it, is from 5 to 15 microns. The powder particles, whether produced by crushing or that are heated, preferably have a substantially uniform diameter, for example with substantially none of the particles having a diameter more than 3 times the diameter of a significant proportion of any of the other particles. If crushing produces oversize particles they are preferably sieved away and rejected.

Although it is necessary to activate the support material on which the catalytic substance is actually deposited it is of course possible for this support material itself to be carried by a second support material, in which event this second support material of course may not have to be activated in this manner. For instance the final catalyst made by the invention may comprise catalytic substance deposited on, for instance, alumina that has been activated in the described manner and which itself is present as a coating on a honeycomb or other macroporous refractory material which serves as the second support. This refractory material may be a ceramic or may be a metal, for example a steel alloy.

As mentioned, the support material is generally porous. Preferably it contains both a microporous structure with substantially all the pores of the support having a diameter of less than 30 Å preferably the diameter is less than 20 Å and most preferably from 4 to 16 Å. With clays such as montmorillonite this microporous structure can more properly be referred to as interlayer separation. An advantage of using a microporous structure having such small diameters is that the catalyst cannot be poisoned by tars and other large molecules, such as those present in tobacco smoke and which might othersise reduce the activity of the catalyst.

The substance providing catalytically active material may be contacted with the activated surfaces while in nonionic, anionic or cationic form, but preferably it is present in anionic form. Whereas normally it is common to relay upon deposition of the catalytically active material by ion exchange in the invention best results are achieved when deposition follows from physical adsorption of the substance providing the catalytically active material on to the support material, this being particularly useful when the substance is in anionic form. Thus contact between the solution and the support material is maintained for sufficient time for the substance to be physically adsorbed into the pores of the material. Preferably the contact between the solution and the support is conducted over a prolonged period, e.g. at least 6 hours and usually at least 10 hours, so as to give optimum time for metal to be deposited within the pores.

Normally some evaporation at least of the solvent occurs during the contact time, at least 50% of the solvent generally being evaporated off during the contact, and if desired all the solvent may be evaporated off from the support material during the contact. Whilst the initial concentration of the solution can range from being a trace to a higher percentage, say 25%, preferably the concentration is below 2.5% and most preferably the concentration is very low, generally less than 0.2% and preferably less than 0.1%, of the catalytically active material. Best results are obtained with about 0.01 to 0.10% of the metal (e.g. about 750 parts per million metal). If the solution is too concentrated there seems to be a tendency for it to deposit the catalytically active metal on the external surface and not substantially within the pores.

In order to obtain improved physical adsorption into the micropores whilst retaining the advantages of aqueous impregnation it is desirable for the solution of the substance to be a solution that reduces the surface tension of the solution. This organic liquid should be one that is inert to the catalytically active material, reduces the hydrogen bonding within the solution and between the solution and the support, and is wholly miscible with the water in the solution. Often it is preferred that it has molecular dimensions smaller than the pore size of the support material. It should be a solvent itself, and will generally be present in an amount of from 10 to 90% by volume of the mixture, the solution preferably consisting of 20 to 50% water and 50 to 80% of the organic liquid. Classes of organic liquids from which appropriate compounds complying with these requirements can be selected include alcohols, ethers, especially cyclic ethers, and amines. The liquid is usually aliphatic or alicyclic. Preferred compounds are selected from methanol, ethanol, tetrahydrofuran, dioxan and furan. However ethanol may be reacted with platinum compounds and so when the catalytic metal is platinum the preferred solvent is methanol.

Substances that provide the catalytic material in the desired anionic form are readily available. For instance when the catalytic material is to be platinum or a compound of platinum chloroplatinic acid can be used as the source of platinum.

The catalytically active material is generally a metal, or metal oxide, and the metal is preferably a transition metal, most preferably of groups 6, 7 and 8 of the Periodic Table. Preferred metals are Fe, Co, Ni, Ru, Rh, Pd, Os, Ir, Pt, Cr, Mo, Re and W. Particularly preferred for low temperature oxidation of carbon monoxide to carbon dioxide are catalysts containing platinum, palladium, rhodium, rhenium and tin and nickel (although nickel catalysts may be more suitable for industrial uses of the catalysts than in smoking products). Mixtures of metals are often useful, especially mixtures of platinum or palladium with rhodium, rhenium or tin. Especially preferred are catalysts based on platinum, palladium, rhodium, rhodium mixed with palladium or any of these together with tin. Whilst the palladium or platinum are generally present in metallic form the tin may be present as stannous oxide. Such catalysts have particularly stable activity in the presence of moisture.

Catalysts containing two or more metals may be made by contacting the powdered support with a solution containing compounds of both metals or by contacting the powdered support sequentially with solutions of different metal compounds.

The total amount of catalytic metal on the support is preferably from 0.1 to 5%, most preferably 0.5 to 2%.

After physically absorbing the catalytically active material onto the support material it is generally necessary to reduce the substance providing the catalytically active metal and that has been adsorbed before the catalyst is used. Whilst reduction can be conducted with any reducing gas including hydrogen, or hydrogen carbon monoxide mixtures, or with an organic reducing, e.g. formaldehyde, best results are obtained if reduction is with carbon monoxide, preferably substantially pure. Reduction is preferably at a temperature of 100° to 450° C., most preferably 300° to 400° C.

Many catalysts made according to the invention are of values for low temperature oxidation of carbon monoxide to carbon dioxide, for example in the oxidation of stack gases or in motor car or other engine exhausts (especially when carried on a refractory macroporous support) but they are of particular value distributed through smoking products or included in a filter. The filter may be a triple filter, with catalytic powder, either by itself or mixed with absorbents such as granular carbon, in a central component between fibrous end portions. The powder may be loose or may be bonded into a porous plug. The powder may also be bonded to fibres that form the central portion of a triple filter or that are distributed throughout some or all of any filter construction or may be bonded to a sheet which is crumpled or spirally wound to form part or all of a filter.

Examples 1 to 4 are of catalysts particularly suitable for such uses.

EXAMPLE 1

13X zeolite pellets containing clay binder and having a particle size of 1.5 to 3 mm were ground in a domestic grinder and were then sieved to leave a fraction having a particle size of 30 to 60 mesh. Within 1 hour three grams of this powder was mixed with 20 ml water containing 0.75 ml chloroplatinic acid solution (5% w/v) (i.e. an aqueous solution containing 750 ppm platinum). The mixture was left for 12 hours at about 40° C. by which time the solution has evaporated to dryness to leave a free flowing powder.

EXAMPLE 2

The method of Example 1 is repeated except that contact between the solution and the powder is maintained for, for instance, 10 hours, preferably under reflux, and excess solution is then decanted and the wet powder evaporated to dryness.

EXAMPLE 3

The method of Example 1 is repeated except that the solution is a 50% water 50% methanol solution and reduction is by formaldehyde.

EXAMPLE 4

The method of Example 2 is repeated except that the powdered zeolite is first contacted with stannous or stannic ions and after drying is then contacted with chloroplatinic acid.

After drying the products of all four Examples are reduced by carbon monoxide at 350° C.

All the pellets used in the preceding examples are thought to have been made by a method involving calcination. The following is an example of a method in which powder is activated by heating. Zeolite 4A or 5A having a particle size of 5 to 15 microns is heated in air at 580° C. for 24 hours. At the end of the heating step the powder is immediately immersed in a solution of 0.25% chloroplatinic acid in a mixture of equal parts of water and methanol. The solution was allowed to evaporate to dryness over a period of 16 hours and the powder was then reduced by carbon monoxide at 350° C. for 3 hours.

In order to observe the progress of water removal and removal of chemisorbed water and hydroxyl groups differential thermal analysis was conducted during the initial heating step.

Any of the foregoing examples may be repeated using, instead of chloroplatinic acid, sodium chloropalladate ($Na_2Pd\ Cl_4$) and/or ruthenium trichloride $Ru\ Cl_3 \times H_2O$.

All these catalysts have exceptionally good activity for use in smoking products, for example when included in a triple filter.

Other uses of catalysts made in accordance with the methods of the invention include the hydrocracking and hydroreforming of oil, Fischer Tropsch synthesis, the dehydrosulphurisation of oil and the formation of methane from naphtha, catalysts made by heating an amorphous hydroxylic refractory support material being particularly suitable for such uses. Naturally the particle size and the shape of the catalyst for such uses may be coarser than the fine particle size required in smoking products. Example 5 is an example of the production of a catalyst from an amorphous hydroxylic refractory material.

EXAMPLE 5

Alumina of particle size 30 to 60 mesh or other molecular sieve is heated slowly (2 to 3 hours) from ambient temperature to 300° C. It is then transferred to a muffle furnace and maintained at 580° C., for 48 hours and is quenched in sufficient of a solution of chloroplatinic acid to give a pickup of 2% by weight measured as platinum metal. It is then dried at 25° C. and reduced by heating in an atmosphere of hydrogen or CO at 350° C., for 3 hours. The resultant catalysts have markedly increased activity when used in the oxidation of carbon monoxide, aromatisation of n-heptane to toluene and hydrogenation of benzene, as compared with standard catalysts prepared without initial support activation step.

As an example to demonstrate the value of preheating for instance in the manner of Example 5, and utilising the catalyst whilst still activated heptane in hydrogen was continuously passed, in a series of separate experiments, over catalysts maintained at 450° C. A "U" tube, immersed in solid $CO_2$/acetone, was attached to the exit of the catalyst chamber and a bulb, open at both ends, was fitted to the exit of the "U" tube. The bulb was used to collect samples of that material which failed to condense in the "U" tube i.e. light hydrocarbons.

The contents of both traps were analysed by conventional G.C. techniques under standard conditions and comparisons of the peak areas made. From these it was evident that catalyst which has been preheated immediately prior to use gave higher conversions of heptane to toluene accompanied by correspondingly less cracking to the lower hydrocarbons than those supports where pretreatment was omitted.

We claim:

1. In a method of making a catalyst comprising providing a hydroxyl-containing solid refractory support material and contacting the support material with a solution of a substance providing catalytically active material, the improvement comprising activating the support material by providing surfaces of the support material having a deficiency of hydroxyl groups to form activated support material surfaces, and contacting the activated support material surfaces with said solution before said activated support material surfaces are deactivated.

2. A method according to claim 1 in which the activated surfaces are generated by heating the support material under conditions such as to create a deficiency of hydroxyl groups.

3. A method according to claim 1 in which the catalytically active material is present in the said substance in anionic form and is physically adsorbed onto the support material.

4. A method according to claim 1 in which the solution of the said substance is a solution in a mixture of water and an organic liquid that reduces the surface tension of the solution.

5. A method according to claim 4 in which the organic liquid is methanol.

6. A method according to claim 1 in which the catalytically active material is subsequently reduced by treatment with carbon monoxide.

7. A method according to claim 1 in which the catalytically active material is selected from platinum, palladium and rhodium.

8. A method according to claim 1 in which the support material comprises alumina.

9. A method according to claim 1 in which the support material comprises a zeolite.

10. A method according to claim 9 in which the zeolite is zeolite 13X.

11. A method according to claim 9 in which the zeolite is zeolite 4A or 5A.

12. A method according to claim 8 in which the support material comprises alumina on a refractory macroporous support.

13. In a method of making a catalyst comprising providing a hydroxyl-containing solid refractory support material and contacting the support material with a solution of a substance providing catalytically active material, wherein said solid support material is originally in the form of pellets, the improvement comprising activating the support material by crushing said pellets to provide activated support material surfaces, and thereafter contacting the activated support material surfaces with said solution before said activated support material surfaces are deactivated.

14. In a method of making a catalyst comprising providing a hydroxyl-containing solid refractory support material and contacting the support material with a solution of a substance providing catalytically active material, the improvement comprising activating the support material by heating the support material to a temperature of at least 20° C. above the temperature at which expulsion of chemisorbed water is substantially completed but below the temperature at which substantial degradation of the support material occurs to form activated support material surfaces, and contacting the activated support material surfaces with said solution before said activated support material surfaces are deactivated.

15. A method according to claim 14 in which the support material that is heated is in the form of powder having a particle size of less than 50 microns and the contact with the said solution is conducted substantially immediately thereafter.

16. A method according to claim 14 in which the heating is conducted substantially immediately prior to or during the manufacture of pellets of support material, and the activated surfaces are generated by crushing the pellets.

17. A method according to claim 1 in which the activated surfaces are generated by heating the support material under conditions such as to create a deficiency of hydroxyl groups at a temperature of 300° to 800° C.

18. A method according to claim 17 in which the support material is a zeolite or alumina and the heating is at a temperature of 400° to 650° C.

19. A catalyst made by a method according to claim 1.

20. A method according to claim 1, wherein said support material is a porous refractory material.

21. A method according to claim 1, wherein said support material is selected from the group consisting of alumina, silica, titania, magnesium, zirconia, silico-aluminate and zeolite materials.

22. A method according to claim 1, wherein said activated surfaces have Lewis acid sites therein.

23. A method according to claim 1, wherein the catalytic active material is present in said surfaces in anionic form, and is physically adsorbed onto the support material, and said catalytic active material is selected from the group consisting of platinum, palladium and rhodium.

24. A method according to claim 1, wherein said activated support material surfaces are activated to the extent that when subjected to differential thermal analysis no large temperature difference due to physically absorbed water will be noted, and a gradual increase in temperature difference will be noted.

25. A method according to claim 1, wherein said activated support material surfaces when subjected to iodine titration exhibits a titre decrease which cannot substantially be further decreased upon heating.

* * * * *